Sept. 28, 1926.

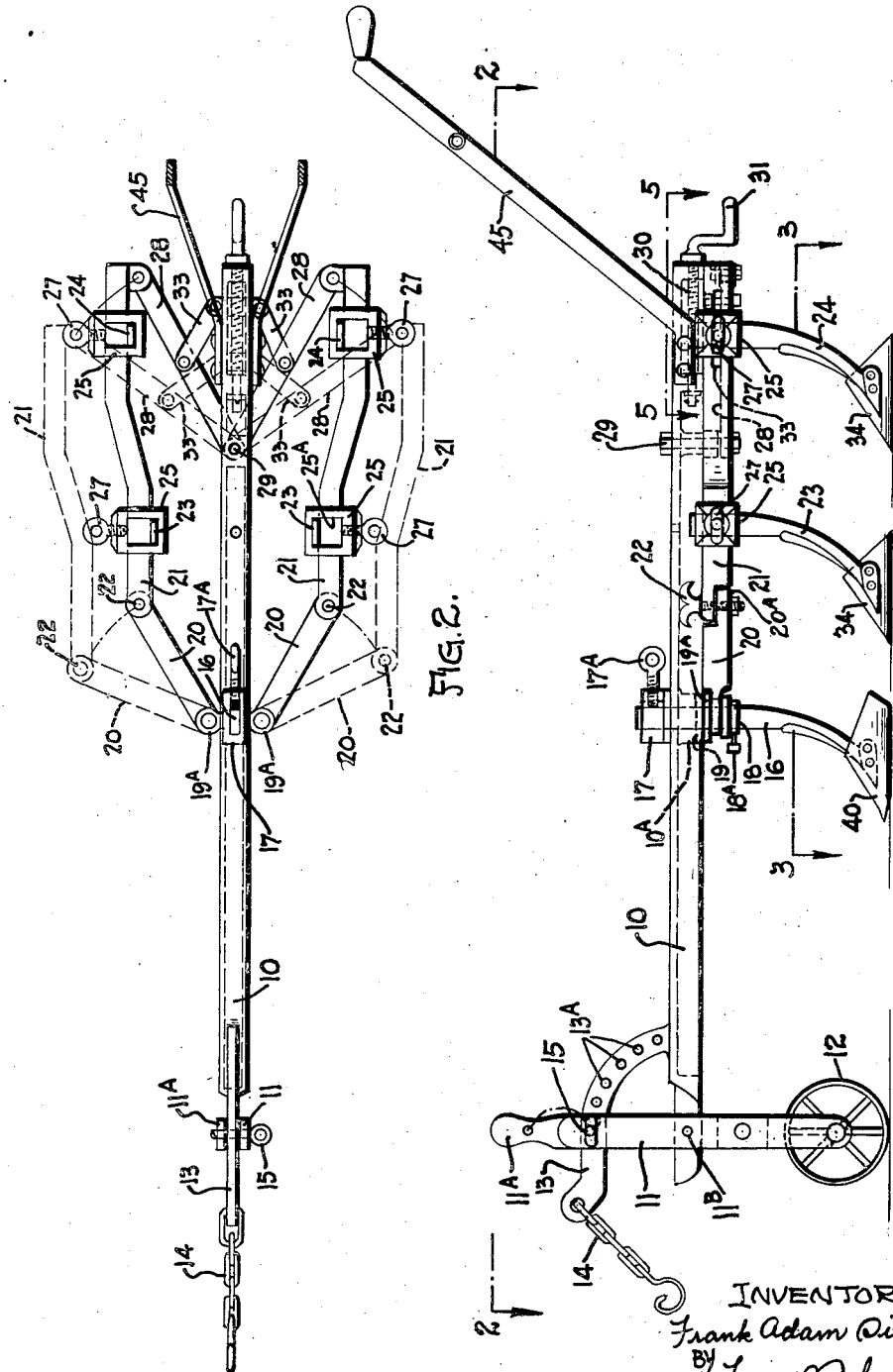

F. A. SILAJ 1,601,512

CULTIVATOR

Filed March 28, 1925    3 Sheets-Sheet 2

INVENTOR
Frank Adam Silaj
BY
Frank Schraeder Jr.
Attorney

Sept. 28, 1926.

F. A. SILAJ 1,601,512

CULTIVATOR

Filed March 28, 1925      3 Sheets-Sheet 3

INVENTOR
Frank Adam Silaj
BY
Frank J. Schraeder Jr.
Attorney.

Patented Sept. 28, 1926.

1,601,512

UNITED STATES PATENT OFFICE.

FRANK ADAM SILAJ, OF CHICAGO, ILLINOIS

CULTIVATOR.

Application filed March 28, 1925. Serial No. 18,992.

This invention relates to cultivators and has among its objects the provision of a novel adjustable support for the cultivating blades.

Another object of the invention resides in the novel relative mounting and arrangement of the cultivator blades.

A still further object of my invention resides in the combined adjustable mounting of the cultivator blades which affords not only a vertical adjustment of same but a relative lateral adjustment of the blades.

With these and other objects in view my invention consists in the novel combination, construction and arrangement of the parts and members shown in the accompanying drawings, described in the following specifications and particularly pointed out in the appended claims.

Referring to the illustrations, Fig. 1, is a side elevation of a cultivator embodying one form of my invention;

Fig. 2 is a plan view of same taken on line 2—2 of Fig. 1;

Figures 7, 8:
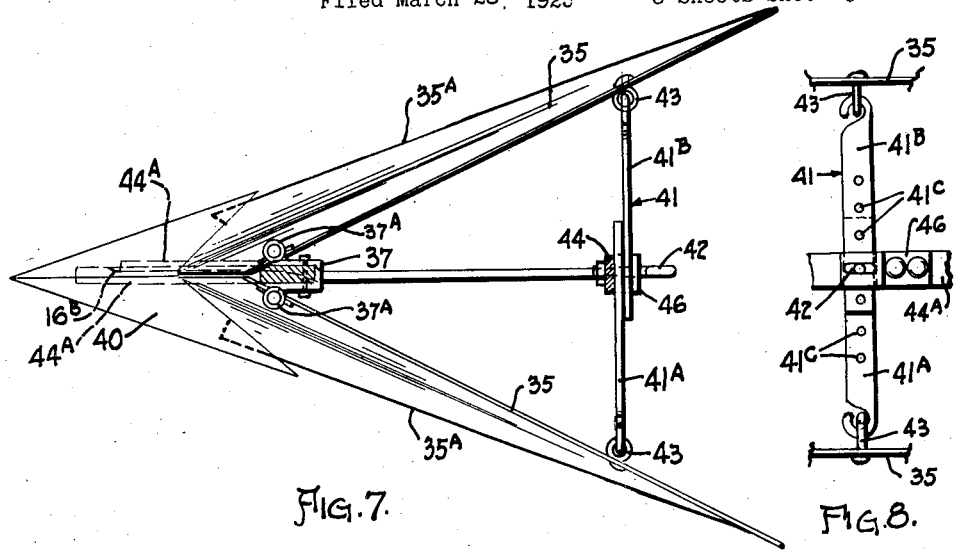
Figure 6:
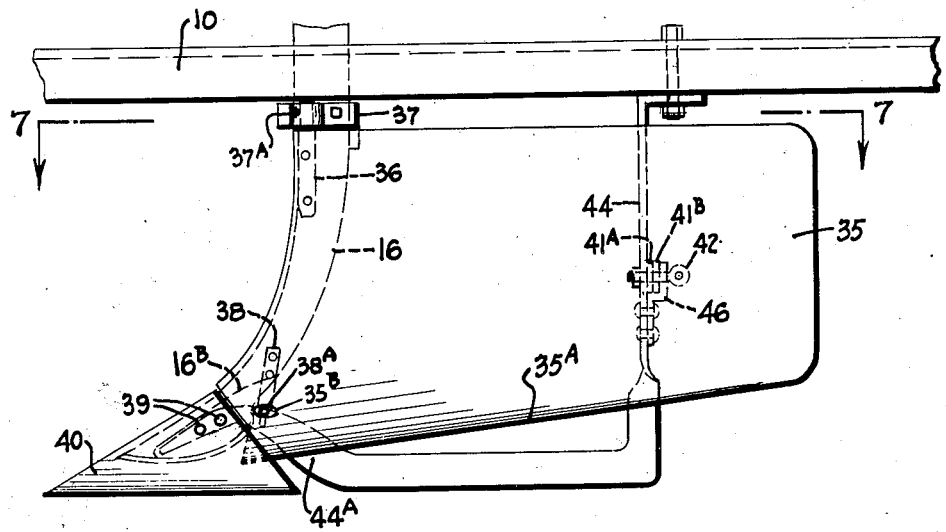
Fig. 6, is a side elevation of the front or central cultivator blade.

Fig. 7, a plan view of same taken on line 7—7 of Fig. 6.

Fig. 8, is a side view of the adjustable strut for varying the relative angular support of the two blades of the central cultivator.

Referring now to the illustrations, 10 indicates a central longitudinally extending beam which is preferably of steel or cast iron and of a general U cross section.

The front end of the beam 10 is pivotally mounted between a pair of bars 11 and supported at their lower end on the wheel 12 and terminating at their upper end in the handle $11^A$. An arcuate traction bar 13 is rigidly secured to the beam 10 and the free end is provided with a chain 14 or any other suitable connection to which a tractor or the like may be attached for propelling the cultivator.

The bars 11 carry a bolt 15 which is adapted to support the bars 11 in any one of the desirable angular positions which are afforded by the angular positioning of same about the pivotal pin $11^B$ and the insertion of the bolt 15 in either one of the holes $13^A$ in the arcuate bar 13. Angularly disposing the bars 11 will obviously raise or lower the front end of the cultivator.

The front or central cultivator blade support 16 is mounted for vertical adjustment in the integral boss $10^A$ of the beam 10 and is held in rigid position by a pair of upper and lower collars 17 and 18 having respectively screws $17^A$ and $18^A$ for rigidly holding same to the support 16.

Supported on the support 16 between the boss $10^A$ and the collar 18 is a bracket 19 terminating with laterally disposed pivotal ears $19^A$ for the links 20.

The links 20 terminate in ends $20^A$ which are halved with the ends of the cultivator blade supporting frames 21, a suitable screw 22 forming the pivotal pin for said connection.

The frames 21 are bent intermediate their ends to throw their rear ends further outwardly from the center of the beam 10 and thus affording a disalignment of the two sets of blade supports 23 and 24.

The cultivator blades 23 and 24 are rigidly mounted for vertical adjustment in the U-shaped clevis 25 which has slidable adjustment on the frames 21 and the upper and lower ends of which are provided with square openings $25^A$ through which the supports 23 and 24 extend. Tightening of the screws 27 which are threaded into the clevises 25 will rigidly retain the supports 23 and 24 against the frames 21.

The rear ends of the frames 21 are pivotally connected to the links 28 which are joined together for pivotal movement about the pin 29 supported in the beam 10.

For the purpose of moving the frames 21 inwardly and outwardly of the beam 10, about their pivotally mounted links 20 and 28, I provide a mechanism which comprises a screw 30 which is supported for rotary movement in the integral beam cross bearings $10^B$ and $10^C$. The screw 30 is rotated by the hand crank 31 and carries a block 32 threaded thereon and arranged for longitudinal movement thereof by turning of the crank 31. The block 32 is formed with a pair of oppositely disposed U-shaped integral ears $32^A$ between which are pivotally mounted links 33, the outer ends of which have pivotal connection approximately intermediate the link 28.

It is now readily apparent that the rotation of the crank 31 will cause a longitudinal movement thereof of the block 32 which will impart movement to the link 28 for moving the frames inwardly or outwardly of the beam 10, as shown by the dotted lines in Fig. 2.

Figure 3:
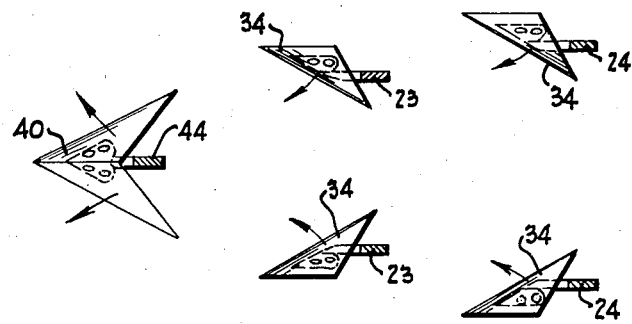
Fig. 3, is a section view taken on line 3—3 of Fig. 1, showing the relative arrangement of the cultivator blades.
Figure 4:
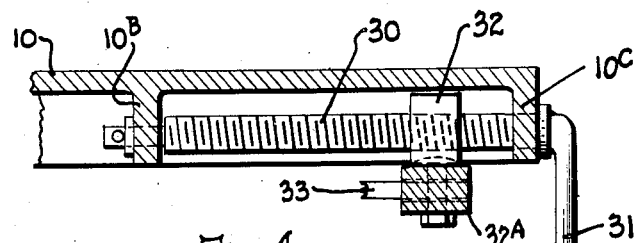
Fig. 4, is a longitudinal section of the screw adjustment for the cultivator blade supporting frame; and, Fig. 5, is a plan view of same taken on line 5—5 of Fig. 1.
Figure 5:
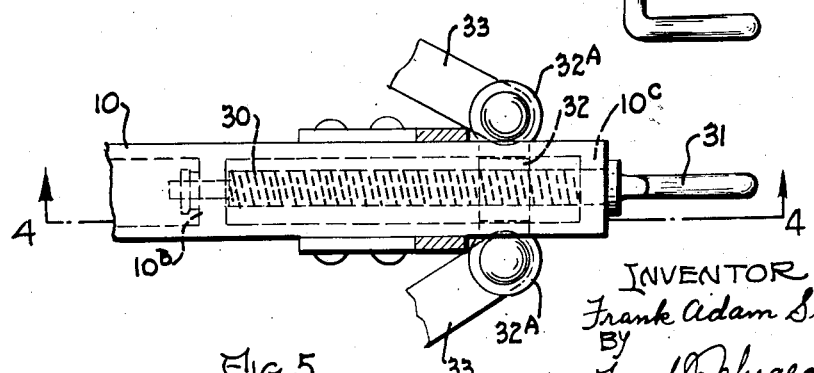

The supports 23 and 24 carry rigidly mounted to their lower ends the triangular cultivator blades 34. The blades of the supports 23, as shown in Fig. 3, are oppositely disposed, likewise the blades of the supports 24, for turning the soil toward each other.

The front or central cultivator blades 35 are substantially of a slight arcuate formation toward their lower edge 35$^A$ which is cut at an angle upwardly to the rear. The front edge is curved to conform to the support 16. The blades 35 carry a strap 36 at the upper front end which is rounded at its free end for projection into the ears 37$^A$ of the clevis 37 which is bolted to the support 16. The lower front portions are supported on the bent rounded ends 38$^A$ of the straps 38 rigidly mounted on the lower end of the support 16. The ends 38$^A$ extend through the elongated slots 35$^B$ in the blades.

Bolted to the lower end of the support 16 with bolts 39, is a shoe 40 of special alloy steel to withstand long wear.

The blades 35 are cross connected together with an adjustable strut 41 comprising a pair of bars 41$^A$ and 41$^B$ overlapped at the inner ends and provided with a plurality of holes 41$^C$ and a bolt 42 for adjustable lateral arrangement.

The outer ends of the strut 41 are hooked into the eye-bolts 43 mounted in the blades 35.

A flat bar 44 is bolted to the under side of the beam 10 and extends vertically to a central point between the strut 41 and at such point is provided with a clip bar 46 for embracing and by means of the bolt 42 retaining the strut 41.

Below the strut 41, the bar 44 is twisted and then bent at a right angle and extended toward the curved pointed hooked end 44$^A$ which extends into the shoe 40 and within the depressed portion 16$^B$ of the support 16; the bolts 39 securely retaining same.

It will now be readily apparent that by the adjustment of the strut 41, the blades 35 may be regulated to take a wider or narrower furrow.

The handle bars 45 provide means for manually steering of the cultivator.

I claim:

1. In a cultivator, the combination of a central beam extending centrally and longitudinally of said cultivator, a pivotal support for the front end of said beam, a wheel supporting the lower end of said support, an arcuate traction bar fixed at one end to said beam, means for connecting the upper end of said pivotal support to said traction bar at variable angular positions whereby the front end of said beam can be carried at variable distances above the ground, a vertically adjustable cultivator support mounted on the longitudinal axis of said beam, a central cultivator mounted on said cultivator support, said central cultivator comprising a plow shoe fixed to the lower end of said cultivator support and a pair of oppositely disposed blades extending upwardly and rearwardly from both sides of said shoe and means for supporting said blades adapted for adjustably varying the distance of said blades from the longitudinal axis of the cultivator; a pair of side frames pivotally mounted, one on each side of said beam, a front link pivotally connecting the front end of each of said frames to said beam, a rear link pivotally connecting the rear end of each of said frames to said beam, a plurality of side cultivator blade support sockets mounted on each frame and adjustable longitudinally thereon, said frames being bent to disalign said sockets longitudinally of the cultivator, cultivator blade supports mounted in said sockets and adapted for vertical adjustment therein, a cultivator blade secured to each of said side cultivator blade supports, and mechanism for simultaneously adjusting said side cultivator blades transversely to said beam.

2. In a cultivator, the combination of a central beam extending centrally and longitudinally of said cultivator, a pivotal support for the front end of said beam, a wheel supporting the lower end of said support, an arcuate traction bar fixed at one end to said beam, means for connecting the upper end of said pivotal support to said traction bar at variable angular positions whereby the front end of said beam can be carried at variable distances above the ground, a vertically adjustable cultivator support mounted on the longitudinal axis of said beam, a central cultivator mounted on said cultivator support, said central cultivator comprising a plow shoe fixed to the lower end of said cultivator support and a pair of oppositely disposed blades extending upwardly and rearwardly from both sides of said shoe, and means for supporting said blades adapted for adjustably varying the distance of said blades from the longitudinal axis of the cultivator, a pair of side frames pivotally mounted, one on each side of said beam, a front link pivotally connecting the front end of each of said frames to said beam, a rear link pivotally connecting the rear end of each of said frames to said beam, a plurality of side cultivator blade support sockets mounted on each frame and adjustable longitudinally thereon, said frames being bent to disalign said sockets longitudinally of the cultivator, cultivator blade supports mounted in said sockets and adapted for vertical adjustment therein, a cultivator blade secured to each of said side cultivator blade supports, and mechanism for simultaneously adjusting said side cultivator blades transversely to said beam, said mechanism comprising a screw, a hand crank for said screw, a pair of bearings on said beam for said screw, a block mounted for movement on said screw, and a pair of links pivotally connecting said block with said rear links connected to the rear end of said frames.

In witness whereof I affix my signature.

FRANK ADAM SILAJ.